(12) United States Patent
Contractor et al.

(10) Patent No.: US 10,438,499 B2
(45) Date of Patent: Oct. 8, 2019

(54) IDENTIFICATION OF COMPREHENSION BURDEN IN MULTIMEDIA CONTENT

(71) Applicant: International Business Machines Corporation, Armonk, NY (US)

(72) Inventors: Danish Contractor, Gurgaon (IN); Mukesh Kumar Mohania, New Delhi (IN); Sumit Negi, New Delhi (IN); Chalapathy V. Neti, Yorktown Heights, NY (US); Nitendra Rajput, Gurgaon (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 482 days.

(21) Appl. No.: 14/449,553

(22) Filed: Aug. 1, 2014

(65) Prior Publication Data

US 2016/0034816 A1 Feb. 4, 2016

(51) Int. Cl.
*G09B 5/06* (2006.01)

(52) U.S. Cl.
CPC ..................... *G09B 5/06* (2013.01)

(58) Field of Classification Search
CPC ........... G06F 17/30864; G06F 17/2229; G06F 17/2288; G06F 17/30867; G06F 17/30702; G06F 17/30029; G06F 17/30687; G06F 17/30; G06Q 30/02; G09B 17/006; G09B 19/06; G09B 7/00; G09B 3/00; G09B 19/00; A61B 5/16; A61B 5/162; A61B 5/4088; H04N 21/4665; H04N 21/482
USPC .......................................................... 706/62
See application file for complete search history.

(56) References Cited

U.S. PATENT DOCUMENTS

| | | | |
|---|---|---|---|
| 7,793,212 B2 * | 9/2010 | Adams, Jr. ........ | G06F 17/30038 715/203 |
| 8,126,700 B2 | 2/2012 | Fasciani et al. | |
| 8,488,916 B2 | 7/2013 | Terman | |
| 2005/0050163 A1 * | 3/2005 | Cole ................ | G06F 17/30864 709/217 |
| 2006/0008781 A1 * | 1/2006 | Townshend ......... | G09B 17/006 434/178 |

(Continued)

FOREIGN PATENT DOCUMENTS

| | | |
|---|---|---|
| WO | WO2004008780 A1 | 1/2004 |
| WO | WO2012034975 A1 | 3/2012 |

OTHER PUBLICATIONS

Agrawal, Rakesh, "Computational Education: The Next Frontier for Digital Libraries?", 15th International Conference on Asia-Pacific Digital Libraries, Dec. 9, 2013, Bangalore, India, 32 Pages.

Squires, David et al., "Predicting quality in educational software: Evaluating for learning, usability and the synergy between them", Interacting with Computers, May 1999, pp. 467-483, vol. 11, No. 5, Elsevier Science B.V., Netherlands.

(Continued)

*Primary Examiner* — Robert A Cassity
*Assistant Examiner* — Peter D Coughlan
(74) *Attorney, Agent, or Firm* — Ference & Associates LLC (57) ABSTRACT

Methods and arrangements for identifying burden comprehension in multimedia content. A contemplated method includes: accepting multimedia input; detecting components of the multimedia input; determining a comprehension burden score of each of the detected components; and thereupon calculating a total comprehension burden score for the multimedia input. Other variants and embodiments are broadly contemplated herein.

18 Claims, 3 Drawing Sheets

(56) References Cited

U.S. PATENT DOCUMENTS

| | | | | |
|---|---|---|---|---|
| 2006/0282413 | A1* | 12/2006 | Bondi | G06F 17/30864 |
| 2008/0046232 | A1* | 2/2008 | Groppe | G09B 19/06 |
| | | | | 704/9 |
| 2009/0150917 | A1* | 6/2009 | Huffman | H04H 60/31 |
| | | | | 725/9 |
| 2009/0234831 | A1* | 9/2009 | Ebadollahi | G06F 17/30038 |
| 2010/0299303 | A1* | 11/2010 | Horster | G06F 17/30029 |
| | | | | 706/52 |
| 2012/0215773 | A1* | 8/2012 | Si | G06Q 30/02 |
| | | | | 707/723 |
| 2013/0309639 | A1 | 11/2013 | Sheehan et al. | |
| 2014/0189484 | A1* | 7/2014 | Fountenberry | G06F 17/2229 |
| | | | | 715/229 |
| 2016/0239496 | A1* | 8/2016 | Motte | G06F 17/278 |

OTHER PUBLICATIONS

Agrawal, Rakesh, et al., "Empowering Authors to Diagnose Comprehension Burden in Textbooks", The 18th ACM SIGKDD Conference on Knowledge Discovery and Data Mining (KDD '12), Aug. 12-16, 2012, Beijing, China, 9 pages, ACM Digital Library.

Laxton, Benjamin, et al., "Leveraging temporal, contextual and ordering constraints for recognizing complex activities in video", IEEE Conference on Computer Vision and Pattern Recognition (CVPR '07), Jun. 17-22, 2007, Minneapolis, MN, 8 pages, IEEE Digital Library.

Lang, Annie, "Defining Audio/Video Redundancy from a Limited Capacity Information Processing Perspective", Communication Research, Feb. 1995, pp. 86-115, vol. 22, No. 1, SAGE, University of Chicago Library.

* cited by examiner

IDENTIFICATION OF COMPREHENSION BURDEN IN MULTIMEDIA CONTENT

BACKGROUND

When an individual approaches a specific multimedia or rich media learning object, it is helpful to have some advance knowledge of how difficult or easy it may be to acquire the concepts from that learning object. (The terms "rich media" and "multimedia" may be understood to be interchangeable herein.) Since there exist many available learning modalities (e.g., text books, audio podcasts, video lectures) and options (e.g., in a classroom, online, offline) on where and how to acquire the learning concept, it can be important for the individual to appreciate which learning object or medium may lend itself more easily towards understanding a given learning concept. Since learning plans may differ across individuals, and can be tailored to work most effectively with a given individual, it helps to know the attendant "comprehension burden" (a quantitatively defined degree of difficulty or burden associated with learning and/or comprehension) of a given learning object for its use in teaching a given learning concept.

BRIEF SUMMARY

In summary, one aspect of the invention provides a method of identifying comprehension burden in multimedia content, the method comprising: utilizing at least one processor to execute computer code configured to perform the steps of: accepting multimedia input; detecting components of the multimedia input; determining a comprehension burden score of each of the detected components; and thereupon calculating a total comprehension burden score for the multimedia input.

Another aspect of the invention provides an apparatus comprising: at least one processor; and a computer readable storage medium having computer readable program code embodied therewith and executable by the at least one processor, the computer readable program code comprising: computer readable program code configured to accept multimedia input; computer readable program code configured to detect components of the multimedia input; computer readable program code configured to determine a comprehension burden score of each of the detected components; and computer readable program code configured to thereupon calculate a total comprehension burden score for the multimedia input.

An additional aspect of the invention provides a computer program product comprising: a computer readable storage medium having computer readable program code embodied therewith, the computer readable program code comprising: computer readable program code configured to accept multimedia input; computer readable program code configured to detect components of the multimedia input; computer readable program code configured to determine a comprehension burden score of each of the detected components; and computer readable program code configured to thereupon calculate a total comprehension burden score for the multimedia input.

A further aspect of the invention provides a method of identifying comprehension burden in multimedia content, the method comprising: utilizing at least one processor to execute computer code configured to perform the steps of: accepting multimedia input; detecting components of the multimedia input, the components comprising: a text component, an audio component, a presentation component and a video component; determining a comprehension burden score of each of the detected components; and thereupon calculating a total comprehension burden score for the multimedia input.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIGS. 1 and 2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an exemplary embodiment, most if not all of the process steps, components and outputs discussed with respect to FIGS. 1 and 2 can be performed or utilized by way of a processing unit or units and system memory such as those indicated, respectively, at 16' and 28' in FIG. 3, whether on a server computer, a client computer, a node computer in a distributed network, or any combination thereof.

Broadly contemplated herein, in accordance with at least one embodiment of the invention, are methods and arrangements for readily determining the comprehension burden of a learning object, particularly a multimedia or rich media learning object.

Figure 1:
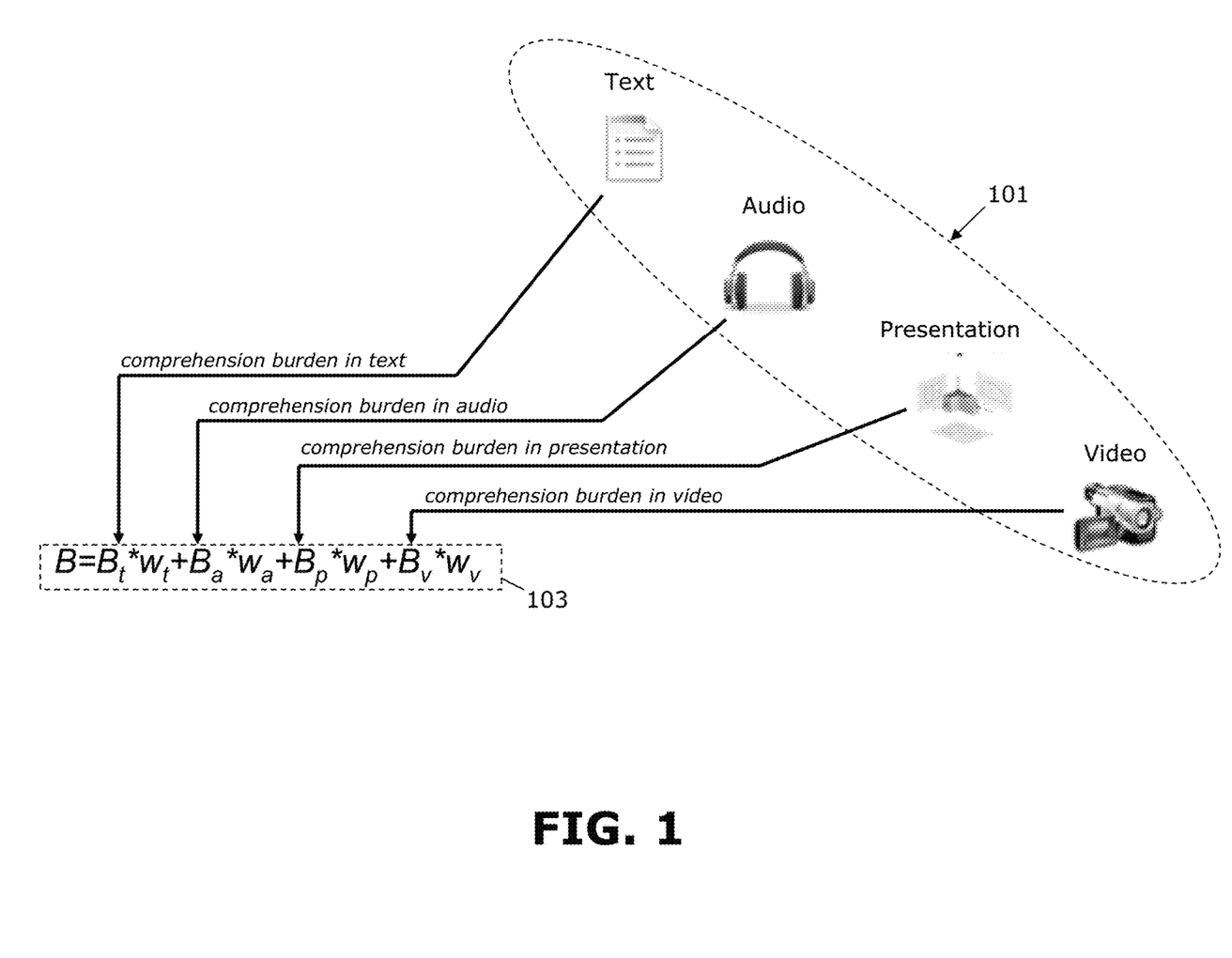
FIG. 1 schematically illustrates general solution components, in accordance with at least one embodiment of the invention.

FIG. 1 schematically illustrates general solution components, in accordance with at least one embodiment of the invention. Generally, in accordance with at least one embodiment of the invention, a rich media (or multimedia) learning object (101) is accepted as input, and a normalized quantity is output that represents the comprehension burden of the object. Here, the object is shown to have several components: text, audio, presentation (e.g., "PowerPoint") and video. Individual quantities for comprehension burden of each of these components ($B_i$) are weighted ($w_i$) and summed to derive the total comprehension burden B (103).

Figure 2:
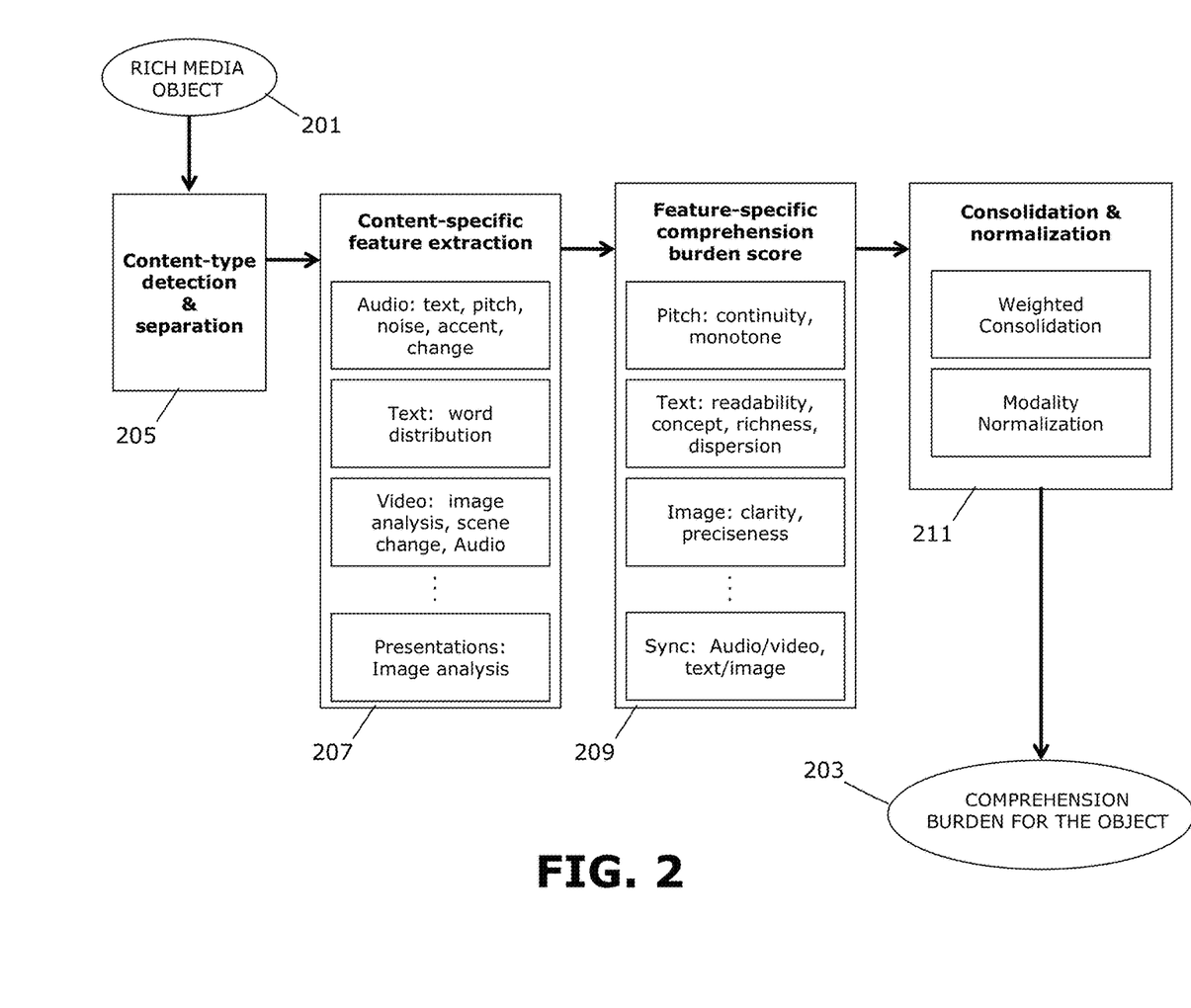
FIG. 2 sets forth a general set of process steps for determining comprehension burden.

FIG. 2 sets forth a general set of process steps for determining comprehension burden. As shown, with rich media (or multimedia) input 201, different components corresponding to different content types are detected and separated (203). In a subsequent step, feature extraction with respect to each content type is undertaken (205). Then, a feature-specific comprehension burden score is determined for each content type (207). Finally, the individual comprehension burden scores corresponding to different content types are consolidated and normalized (209) to create a single comprehension burden score for the entire rich media content (203). Aspects of these steps will be better appreciated and understood from the discussion herebelow.

In accordance with at least one embodiment of the invention, comprehension burden for text can be determined via an assessment of readability, concept density, dispersion and illustrative richness. Each of these components can have a quantitative value associated with it, and then be weighted and summed to result in $B_t$ (as shown in FIG. 1). Readability can employ such parameters as string length, letter count, word count, average words per sentence and average syllables per word. Concept density can involve the identification of key concepts, and their normalization with respect to the length of the text. Dispersion can involve the number of unrelated concept pairs within a text boundary. Illustrative richness can relate to the number of diagrams and examples used to explain a given concept, or the amount of space devoted to text (as opposed, e.g., to diagrams).

In accordance with at least one embodiment of the invention, comprehension burden for audio can be determined via an assessment of noise, repetitiveness, accent and illustrative richness. Each of these components can have a quantitative value associated with it, and then be weighted and summed to result in $B_a$ (as shown in FIG. 1). The accent subcomponent can involve an assessment of the number of different accents and/or languages with respect to the entirety of the audio component. Here, illustrative richness can relate to whether the audio is monotonous and/or has a sufficient number of pauses and variations.

In accordance with at least one embodiment of the invention, comprehension burden for a presentation can be determined via an assessment of the degree of text content, a correlation between colors and concepts, presentation flow and illustrative richness. Each of these components can have a quantitative value associated with it, and then be weighted and summed to result in $B_p$ (as shown in FIG. 1). For degree of text content, a simple assessment can be made of the average amount of text per slide. Color/concept correlation can involve an assessment of whether colors correlate with different concepts that a chart discusses; to this end, for example, the number of colors can be divided by the number of concepts. For presentation flow, an assessment can be made as to whether there is continuity between two consecutive charts (e.g., by dividing the number of common units by the total number of units). Here, illustrative richness can again relate to the number of diagrams and examples used to explain a given concept, or the amount of space devoted to text (as opposed, e.g., to diagrams).

In accordance with at least one embodiment of the invention, comprehension burden for video can be determined via an assessment of synchronization, quality, order and illustrative richness. Each of these components can have a quantitative value associated with it, and then be weighted and summed to result in $B_v$ (as shown in FIG. 1). Synchronization can involve a determination of the degree to which a visual aspect of a video "stretches" beyond its accompanying audio commentary. Quality can relate, among other things, to video quality, bit rate, sampling rate, whether or not the video is high definition, etc. Order can relate to whether the beginning and end of the video include an introduction and a summary, respectively. Illustrative richness, here, can relate to a number or degree of animations, colors, voices, modulations and musical sections in the video.

In accordance with at least one embodiment of the invention, the normalization step can involve initially obtaining user feedback. Particularly, users can be asked questions about their degree of comprehension and retention of various learning concepts from learning objects. A normalization factor can be generated therefrom to determine the weights $w_i$ mentioned above.

In accordance with at least one embodiment of the invention, a total comprehension burden score, or individual components thereof, can be stored in memory or displayed to a user on a screen, as might fit the needs of one or more users.

Figure 3:
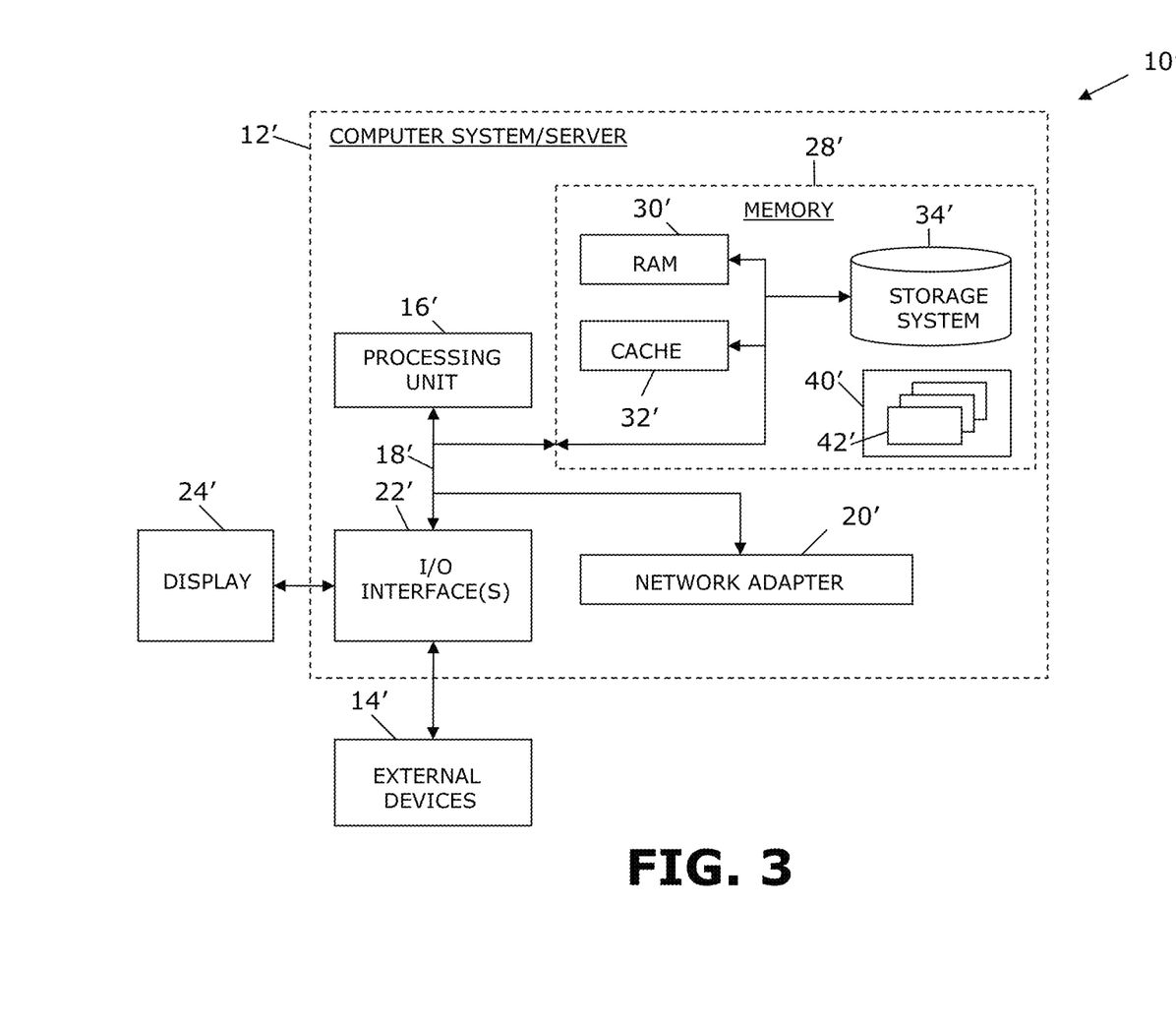
FIG. 3 illustrates a computer system.

Referring now to FIG. 3, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of identifying comprehension burden in multimedia content, said method comprising:
    utilizing at least one processor to execute computer code configured to perform the steps of:
    identifying a preferred learning methodology for a user;
    accepting digital multimedia content as input
    detecting components of the multimedia content, each of the components being associated with a different content type;
    determining a comprehension burden score of each of the detected components, wherein the determining comprises:
        identifying sub-components of each of the components;
        assessing each of the sub-components;
        assigning, based on the accessing, a quantitative value to each of the sub-components; and
        determining the comprehension burden score via aggregating the sub-components;
    weighting, based on the preferred learning methodology, the determined comprehension burden score of each of the detected components;
    thereupon calculating, based upon the weighted comprehension burden scores, a total comprehension burden score for the multimedia content, wherein the total comprehension burden score is associated with the user's ability to comprehend the multimedia content; and
    providing the total comprehension burden score for the multimedia content to the user prior to the user accessing the multimedia content.

2. The method according to claim 1, comprising extracting features for each of the components towards determining a comprehension burden score of each of the components.

3. The method according to claim 1, wherein one of the components comprises a text component.

4. The method according to claim 3, wherein determining a comprehension burden score of the text component comprises determining at least one of: readability, concept density, dispersion and illustrative richness.

5. The method according to claim 1, wherein one of the components comprises an audio component.

6. The method according to claim 5, wherein determining a comprehension burden score of the audio component comprises determining at least one of: noise, repetitiveness, accent and illustrative richness.

7. The method according to claim 1, wherein one of the components comprises a presentation component.

8. The method according to claim 7, wherein determining a comprehension burden score of the presentation component comprises determining at least one of: a degree of text content, a correlation between colors and concepts, presentation flow and illustrative richness.

9. The method according to claim 1, wherein one of the components comprises a video component.

10. The method according to claim 9, wherein determining a comprehension burden score of the video component comprises determining at least one of: synchronization, quality, order and illustrative richness.

11. An apparatus comprising:
at least one processor; and
a computer readable storage medium having computer readable program code embodied therewith and executable by the at least one processor, the computer readable program code comprising:
computer readable program code configured to identify a preferred learning methodology for a user;
computer readable program code configured to accept digital multimedia content as input;
computer readable program code configured to detect components of the multimedia content, each of the components being associated with a different content type;
computer readable program code configured to determine a comprehension burden score of each of the detected components, wherein the determining comprises:
identifying sub-components of each of the components;
assessing each of the sub-components;
assigning, based on the accessing, a quantitative value to each of the sub-components; and
determining the comprehension burden score via aggregating the sub-components;
weighting, based on the preferred learning methodology, the determined comprehension burden score of each of the detected components;
computer readable program code configured to thereupon calculate, based upon the weighted comprehension burden scores, a total comprehension burden score for the multimedia content, wherein the total comprehension burden score is associated with the user's ability to comprehend the multimedia content; and
computer readable program code configured to provide the total comprehension burden score for the multimedia content to the user prior to the user accessing the multimedia content.

12. A computer program product comprising:
a computer readable storage medium having computer readable program code embodied therewith, the computer readable program code comprising:
computer readable program code configured to identify a preferred learning methodology for a user;
computer readable program code configured to accept digital multimedia content as input;
computer readable program code configured to detect components of the multimedia content, each of the components being associated with a different content type;
computer readable program code configured to determine a comprehension burden score of each of the detected components, wherein the determining comprises:
identifying sub-components of each of the components;
assessing each of the sub-components;
assigning, based on the accessing, a quantitative value to each of the sub-components; and
determining the comprehension burden score via aggregating the sub-components;
weighting, based on the preferred learning methodology, the determined comprehension burden score of each of the detected components;
computer readable program code configured to thereupon calculate, based upon the weighted comprehension burden scores, a total comprehension burden score for the multimedia content, wherein the total comprehension burden score is associated with the user's ability to comprehend the multimedia content; and
computer readable program code configured to provide the total comprehension burden score for the multimedia content to the user prior to the user accessing the multimedia content.

13. The computer program product according to claim 12, comprising extracting features for each of the components towards determining a comprehension burden score of each of the components.

14. The computer program product according to claim 12, wherein one of the components comprises a text component.

15. The computer program product according to claim 12, wherein one of the components comprises an audio component.

16. The computer program product according to claim 12, wherein one of the components comprises a presentation component.

17. The computer program product according to claim 12, wherein one of the components comprises a video component.

18. A method of identifying comprehension burden in multimedia content, said method comprising:
utilizing at least one processor to execute computer code configured to perform the steps of:
identifying a preferred learning methodology for a user;
accepting digital multimedia content as input;
detecting components of the multimedia content, each of the components being associated with a different content type and wherein the content types comprises: a text component, an audio component, a presentation component and a video component;
determining a comprehension burden score of each of the detected components, wherein the determining comprises:
identifying sub-components of each of the components;
assessing each of the sub-components;
assigning, based on the accessing, a quantitative value to each of the sub-components; and
determining the comprehension burdens core via aggregating the sub-components;
weighting, based on the preferred learning methodology, the determined comprehension burden score of each of the detected components;
thereupon calculating, based upon the weighted comprehension burden scores, a total comprehension burden score for the multimedia input, wherein the total comprehension burden score is associated with the user's ability to comprehend the multimedia content; and providing the total comprehension burden score for the multimedia content to the user prior to the user accessing the multimedia content.

* * * * *